United States Patent
Lee et al.

(10) Patent No.: US 12,468,257 B2
(45) Date of Patent: Nov. 11, 2025

(54) METHOD AND APPARATUS FOR HOLOGRAPHIC RECORDING

(71) Applicant: KWANGWOON UNIVERSITY INDUSTRY-ACADEMIC COLLABORATION FOUNDATION, Seoul (KR)

(72) Inventors: Seung Hyun Lee, Namyangju-si (KR); Lee Hwan Hwang, Incheon (KR); Soon Chul Kwon, Seoul (KR); Jungho Kim, Uijeongbu-si (KR); Philippe Gentet, Seoul (KR)

(73) Assignee: KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 441 days.

(21) Appl. No.: 18/062,965

(22) Filed: Dec. 7, 2022

(65) Prior Publication Data
US 2024/0184246 A1 Jun. 6, 2024

(30) Foreign Application Priority Data
Dec. 1, 2022 (KR) .................. 10-2022-0165766

(51) Int. Cl.
*G03H 1/22* (2006.01)
(52) U.S. Cl.
CPC ................ *G03H 1/2294* (2013.01)
(58) Field of Classification Search
CPC ......... G03H 1/2294; G03H 2001/0224; G03H 2001/0439; G03H 1/0486;
(Continued)

(56) References Cited

U.S. PATENT DOCUMENTS

2011/0292363 A1* 12/2011 Ivey .................... G03F 7/70158
355/55
2013/0308170 A1 11/2013 Pyun et al.
(Continued)

FOREIGN PATENT DOCUMENTS

KR 10-2014-0115168 A 9/2014
KR 10-2015-0072151 A 6/2015
(Continued)

OTHER PUBLICATIONS

Hwang, Leehwan et al. (2022) "Uniformity improvement of a reconstructed-holographic image in a near-eye display system using off-axis HOE," Optics Express. doi:10.1364/OE.460680.
(Continued)

*Primary Examiner* — Collin X Beatty
(74) *Attorney, Agent, or Firm* — BROADVIEW IP LAW, PC (57) ABSTRACT

The present invention relates to a method and apparatus for holographic recording based on holographic printing technology, and more specifically, to a method and apparatus for holographic recording, in which the hologram is recorded after the deviation in diffraction efficiency for each hogel is pre-compensated for by varying the intensity (luminance) of the object beam for each hogel during the hologram recording in response to a deviation in diffraction efficiency (reconstruction efficiency) for each hogel of a holographic recording surface that occurs when the hologram is reproduced. Accordingly, the reproduction imbalance of a near-eye display (NED) using a holographic optical element (HOE) is resolved by controlling the diffraction efficiency uniform on the entire holographic recording surface when the hologram is reproduced.

8 Claims, 8 Drawing Sheets

(58) Field of Classification Search
CPC ......... G03H 2001/048; G03H 2240/52; G03H 2240/53; G03H 1/0476; G03H 1/0402; G03H 2222/12; G02B 2027/0109; G02B 2027/0174; G02B 27/0172
See application file for complete search history.

(56) References Cited

U.S. PATENT DOCUMENTS

| | | | |
|---|---|---|---|
| 2014/0185115 A1 | 7/2014 | An et al. | |
| 2016/0313559 A1 | 10/2016 | Yamada | |
| 2022/0066204 A1* | 3/2022 | Pfeiffer | G02B 27/0081 |
| 2022/0365483 A1 | 11/2022 | Hong et al. | |

FOREIGN PATENT DOCUMENTS

| | | |
|---|---|---|
| KR | 10-2022-0065446 A | 5/2022 |
| KR | 10-2022-0080830 A | 6/2022 |

OTHER PUBLICATIONS

Extended European Search Report for EP 23183291.6 by European Patent Office dated Aug. 5, 2024.
Office Action for JP 2023-137397 by Japan Patent Office dated Feb. 13, 2024.
Office Action for KR 10-2022-0165766 by Korean Intellectual Property Office dated Apr. 21, 2024.

* cited by examiner

METHOD AND APPARATUS FOR HOLOGRAPHIC RECORDING

CROSS-REFERENCE TO RELATED APPLICATION

This application claims priority under 35 U.S.C § 119 to Korean Patent Application No. 10-2022-0165766 filed in the Korean Intellectual Property Office on Dec. 1, 2022, the entire contents of which are hereby incorporated by reference.

BACKGROUND

1. Field of the Invention

The present invention relates to a method and apparatus for holographic recording based on holographic printing technology, and more specifically, to a method and apparatus for holographic recording that can resolve the reproduction imbalance of a holographic optical element (HOE)-based near-eye display (NED) in which HOEs are used.

2. Discussion of Related Art

Digital holographic printing (DHP) is a digital method of holographic recording rather than a conventional analog method, and is a technology in which a hologram of a still image is reproduced by recording images or interference fringes on a holographic recording medium (holographic film) using a spatial light modulator (SLM). In digital holographic recording, intermittent interference fringes are recorded, and when the intermittent interference fringes are reconstructed, a three-dimensional (3D) image is reproduced by radiating light with the same wavelength as when used for recording.

Digital holographic recording may be divided into a stereogram method and a fringe method according to content and an optical method. The stereogram method is a method in which a multi-view image having a parallax in a vertical direction or vertical/horizontal direction is formed using an object beam and then interference fringes are formed using an optical method with a reference beam and recorded on a holographic recording medium. On the other hand, unlike the stereogram method, the fringe method is a method in which the size of numerically pre-calculated fringe patterns is changed without optical interference and the fringe patterns are recorded on a holographic recording medium.

Hologram technology using digital holographic recording is utilized in a holographic near-eye display (NED) called a holographic head-mounted display (HMD). A holographic NED is a display device to which a 3D image display method is applied, and is a type of display device in which a display panel is positioned close to the user's eyes and worn by the user like glasses. In the holographic NED, a holographic display method, in which an image of an original object is reproduced by radiating and diffracting a reference beam to a hologram pattern in which an interference fringe obtained by interfering with an object beam reflected from the original object and with reference beam is recorded, is used.

In order to reproduce the hologram recorded in this way, a holographic image is reproduced by radiating light having a wavefront of the same angle and wavelength as recording light. For example, when the hologram has been recorded using a collimated beam, an optimal image may be reproduced by allowing the same collimated beam to be incident on the hologram. However, in a general environment, a light source in the form of a point light source emitting light to pixels of a liquid-crystal display (LCD) panel or a liquid crystal on silicon (LCOS) display panel on which an image is reproduced is used. In this case, when the size of a recorded film is small, there is no problem, but when the size of the recorded film is large, an angle of incidence varies according to a position of a hogel (holographic element), which is a minimum recording unit, and thus an angular intensity distribution in which the image is reproduced is different, causing distortion in the image.

DOCUMENT OF RELATED ART

Patent Documents (Patent Document 1) KR 10-2022-0080830 A, published on Jun. 15, 2022
(Patent Document 2) KR 10-2022-0065446 A, published on May 20, 2022
(Patent Document 3) KR 10-2014-0115168 A, published on Sep. 30, 2014

SUMMARY OF THE INVENTION

In a near-eye display (NED) manufactured based on a waveguide, a holographic optical element (HOE) manufactured in a conventional analog method is used. In the case in which the HOE manufactured in the analog method is used, there is a problem in that efficiency of an image is lowered and uniformity is degraded due to a recording initial condition and a difference from a source image. In particular, in an element in which a convex lens or mirror is used, a point light is used as an object beam in order to generate a hologram in which light converges to a single focal point. Assuming that a collimated beam is used as a reference beam, when the hologram recorded in this way is reproduced, the light cannot be refracted uniformly on all surfaces of the convex lens or mirror when light different from the collimated light enters. For this reason, the HOE that is used to enlarge the image and implement a deep depth of field causes different diffraction efficiency from different light rays when an input image of a form different from the collimated beam enters. This causes a reproduction imbalance in a HOE-based NED in which a HOE is used.

Therefore, the present invention is directed to providing a method and apparatus for holographic recording using holographic printing technology that can resolve the reproduction imbalance of a HOE-based NED after pre-compensating for a deviation in diffraction efficiency for each hogel caused by an object beam being incident on a holographic recording surface at different recording angles for each hogel when a hologram is recorded, and by making the diffraction efficiency of an entire recording surface of the hologram uniform when the hologram is reproduced.

The present invention is not limited to the above-described objects, and in addition, various objects may be further provided through techniques described through the following embodiments and claims.

According to an aspect of the present invention, there is provided a method of hologram recording, in which holograms are recorded in a method of tiling an entire recording surface of a holographic recording medium by interfering with an object beam and a reference beam for each divided hogel on the holographic recording medium divided in units of hogels and recording the holograms using holographic printing technology, wherein, when the holograms are recorded on the holographic recording medium for each hogel, the holograms are recorded on the holographic recording medium by varying an intensity of the object beam for each hogel in response to a deviation in diffraction efficiency for each hogel according to a recording angle of each hogel.

The intensity of the object beam may be increased so that brightness increases from a central portion to an edge of the holographic recording medium, or decreased so that the brightness decreases from the edge to the central portion of the holographic recording medium.

When the holograms are recorded on the holographic recording medium for each hogel, the holograms may be recorded by allowing the object beam modulated using a computer-generated hologram (CGH) fringe pattern to be incident on the holographic recording medium.

The CGH fringe pattern may be generated using the Rayleigh-Sommerfeld diffraction integral (RSD).

The generated CGH fringe pattern may be divided into n×m pieces (here, n and m are natural numbers) corresponding to the number of hogels, and the object beam may be modulated using each of the divided pieces of the CGH fringe pattern.

According to an aspect of the present invention, there is provided a, apparatus for hologram recording, in which holograms are recorded in a method of tiling an entire recording surface of a holographic recording medium by interfering with an object beam and a reference beam for each divided hogel on the holographic recording medium divided in units of hogels and recording the holograms using holographic printing technology, the apparatus including a laser configured to output a laser beam, a beam splitter configured to split the laser beam into an object beam and a reference beam, a control computer configured to generate a CGH fringe pattern, an object beam optical unit configured to transmit the object beam to the holographic recording medium and record the holograms on the holographic recording medium, and a reference beam optical unit configured to allow the reference beam to be incident on the holographic recording medium, wherein the object beam optical unit includes a spatial light modulator that modulates the incident object beam using the CGH fringe pattern provided by the control computer, which is controlled by the control computer to modulate the incident object beam by varying an intensity of the incident object beam in response to a deviation in diffraction efficiency for each hogel according to a recording angle for each hogel, and a condensing lens that condenses the object beam modulated by the spatial light modulator onto the holographic recording medium.

The control computer may increase the intensity of the object beam so that brightness increases from a central portion to an edge of the holographic recording medium, or may decrease the intensity of the object beam so that the brightness decreases from the edge to the central portion of the holographic recording medium.

The control computer may generate the CGH fringe pattern using RSD and then divide the generated CGH fringe pattern into n×m pieces horizontally and vertically (here, n and m are natural numbers) corresponding to the number of hogels to provide the divided pieces of the CGH fringe pattern to the spatial light modulator.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, advantages and features of the present invention and methods of achieving the same will be clearly understood with reference to the accompanying drawings and embodiments described in detail below. Like reference numerals refer to like elements throughout the specification. In addition, the expression "A and/or B" may include both A and B or include either A or B. In addition, respective components in each drawing may be excessively illustrated in size and shape, which is for convenience of description and not intended to be limiting.

Figure 1:
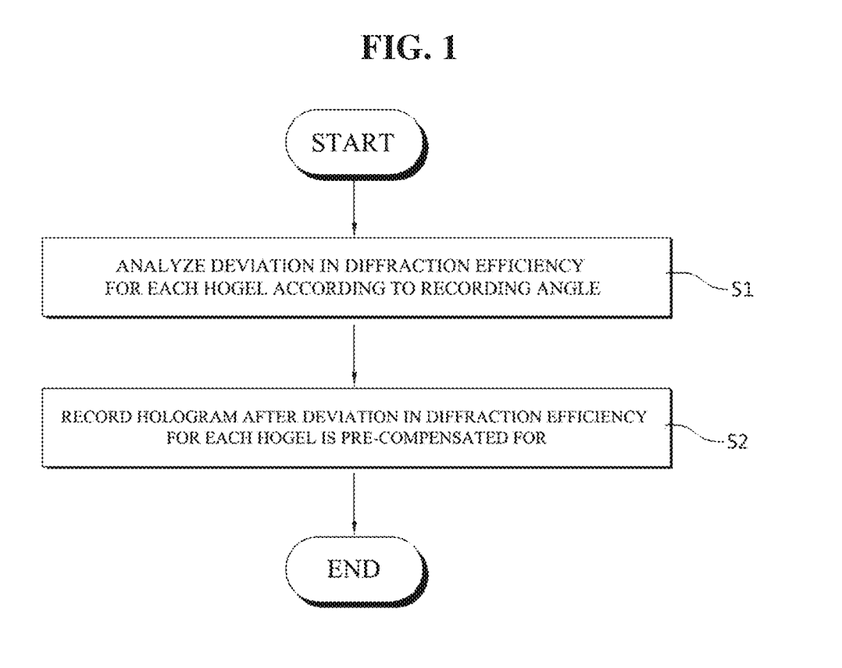
FIG. 1 is a flowchart illustrating a method of hologram recording according to an embodiment of the present invention.

FIG. 1 is a schematic flowchart illustrating a method of hologram recording according to an embodiment of the present invention.

Referring to FIG. 1, in the method of hologram recording according to the embodiment of the present invention, a hologram is recorded on an entire recording surface of a holographic recording medium in a method of tiling the entire recording surface of the holographic recording medium by sequentially recording the hologram for each hogel by interfering with an object beam and a reference beam on the recording surface of the holographic recording medium using holographic printing technology.

When a holographic image recorded through a conventional method of hologram recording is reproduced on a near-eye display (NED) in which a holographic optical element (HOE) is used, a deviation in diffraction efficiency (reconstruction efficiency) occurs for each hogel. This is because holograms are recorded for each hogel at different recording angles. The deviation in diffraction efficiency for each hogel causes a reproduction imbalance when the hologram is reproduced on the HOE-based NED.

Figure 2:
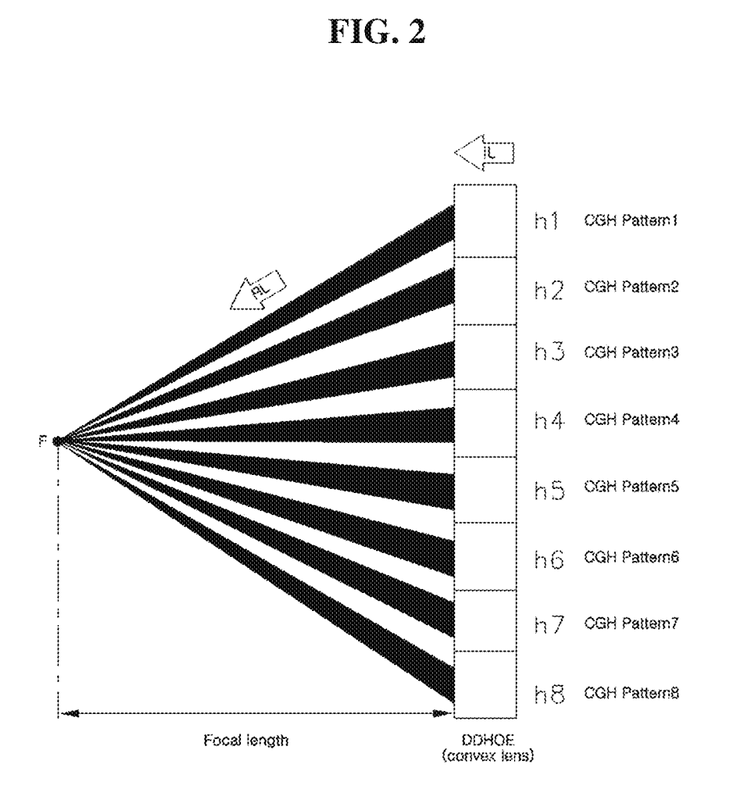
FIG. 2 is a diagram for describing a difference in recording angle for each hogel.

FIG. 2 is a schematic diagram for describing a difference in recording angle for each hogel.

Referring to FIG. 2, in a method of hologram recording using holographic printing technology, holograms are recorded in a method of tiling an entire recording surface of a holographic recording medium by recording the holograms on the holographic recording medium for each hogel (in a method of recording the holograms in units of hogels and then finally combining the images).

In FIG. 2, DDHOE is an abbreviation for a digitally designed HOE, and a DDHOE functions as a convex lens having a constant focal length (i.e., a distance from the DDHOE to a focal point F). For all hogels h1 to h8, light incident in parallel from right to left should be concentrated at a certain focal point F. The DDHOE serves in the same way as a convex lens converges light that enters in parallel from the right, to the focal point F.

As illustrated in FIG. 2, an angle in a direction in which the hogel1 h1 converges light to the focal point F is greater than an angle in a direction in which the hogel4 h4 and the hogel5 h5 converge light to the focal point F. Similarly, the hogel1 h1 and the hogel8 h8, the hogel2 h2 and the hogel7 h7, the hogel3 h3 and the hogel6 h6, and the hogel4 h4 and the hogel6 h6 have different angles. In consideration of two axes (x axis and y axis) rather than one axis, various angles appear according to each hogel.

The hologram recorded during the hologram recording is greatly affected by the angle at which the light is concentrated at the focal point F. That is, when the hologram is reproduced according to the recording angle during the hologram recording, the diffraction efficiency of the hologram varies. Therefore, by lowering the hogels whose diffraction efficiency is relatively increased due to the recording angle, the hologram may be reproduced with uniform light over the entire area without imbalance.

Meanwhile, in FIG. 2, IL denotes incident light, and RL denotes refracted light.

In the method of hologram recording according to the embodiment of the present invention, a deviation in diffraction efficiency that occurs when the hologram is reproduced is pre-compensated in response to different recording angles for each hogel. That is, in order to record the hologram using an apparatus for hologram recording (see FIG. 5), the hologram is recorded after the deviation in diffraction efficiency that may occur when the hologram is reproduced is pre-compensated for.

As illustrated in FIG. 1, in the method of hologram recording according to the embodiment of the present invention, the deviation in diffraction efficiency is first analyzed according to the recording angle for each hogel recorded on the recording surface of the holographic recording medium (S1).

The deviation in diffraction efficiency may be analyzed for each hogel in a method of measuring the deviation in diffraction efficiency for each hogel that occurs when the hologram recorded on the holographic recording medium is reproduced without compensation for the deviation in diffraction efficiency. Alternatively, the deviation in diffraction efficiency for each hogel may be analyzed in a method of calculating the deviation in diffraction efficiency for each hogel in comprehensive consideration of the characteristics (material/size/thickness) of the holographic recording medium, the size of each hogel, the recording angle for each hogel, the characteristics of a light source (reference beam) used when the hologram is reproduced, the characteristics of the HOE used in the NED, and the like.

The deviation in diffraction efficiency analyzed for each hogel may be pre-measured or pre-calculated by a central computer (not illustrated). The deviation in diffraction efficiency for each hogel analyzed in this way may be provided to a control computer 5 that controls the apparatus for hologram recording illustrated in FIG. 5. The control computer 5 varies the intensity of an object beam for each hogel in a spatial light modulator (SLM) 32 of an object beam optical unit 3 on the basis of the provided deviation in diffraction efficiency for each hogel and outputs the object beam to a condensing lens 33. Here, when the central computer that controls the deviation in diffraction efficiency for each hogel or a separate computer that controls the entire operation of the apparatus for hologram recording is configured instead of the control computer 5, the SLM 32 may be controlled by the central computer or the separate computer.

As illustrated in FIG. 1, based on information on the deviation in diffraction efficiency analyzed for each hogel according to the recording angle, the deviation in diffraction efficiency for each hogel is pre-compensated for by varying the intensity (luminance) of the object beam for each hogel according to the deviation in diffraction efficiency for each hogel during the hologram recording (S2). The method in which the deviation in diffraction efficiency for each hogel is pre-compensated for by varying the intensity of the object beam for each hogel according to the deviation in diffraction efficiency for each hogel may be implemented through the control computer 5 illustrated in FIG. 5, and a detailed hologram recording process will be described below with reference to FIG. 6.

The method of hologram recording according to the embodiment of the present invention includes the process of analyzing the deviation in diffraction efficiency for each hogel according to the recording angle for each hogel, as illustrated in FIG. 1, but this is not an essential component. As described above, the deviation in diffraction efficiency for each hogel may be pre-measured or pre-calculated and then registered in a database, and may be used to pre-compensate for the deviation in diffraction efficiency by having the information on the deviation in diffraction efficiency for each hogel pre-registered in the database during the hologram recording.

Figure 3:
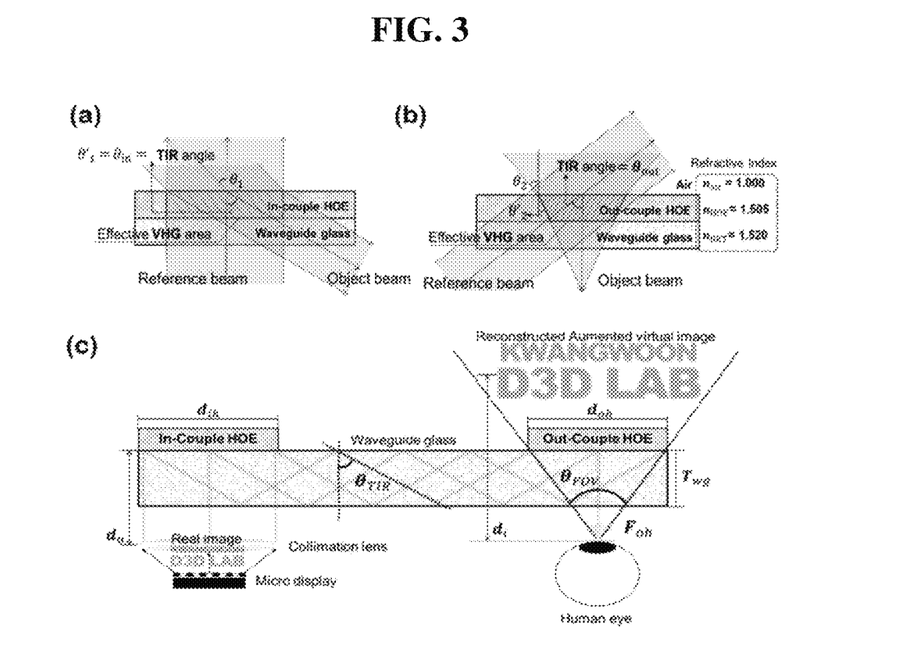
FIG. 3 is a set of diagrams showing virtual augmented reality (AR) images reconstructed in a waveguide-type near-eye display system.

FIG. 3 is a set of schematic diagrams showing virtual augmented reality (AR) images reconstructed in a waveguide-type NED system, wherein FIG. 3A is a diagram showing recording light rays for an in-coupled HOE, FIG. 3B is a diagram showing recording light rays for an out-coupled HOE, and FIG. 3C is a diagram showing the virtual AR images reconstructed in the NED system.

In FIG. 3, the in-coupled HOE represents an element that inputs an image and deflects the image at a total internal reflection (TIR) angle in the NED system, and the out-coupled HOE represents an element that inputs an image which is transmitted by TIR, to the eyes.

Referring to FIG. 3, in the in-coupled HOE, for example, Covestro's photopolymer is used as a holographic material. Air, a photopolymer, and waveguide glass have different refractive indexes. Therefore, a TIR angle at a final stage should have a value greater than or equal to a critical angle that can satisfy a condition. A point at which a TIR angle $\theta_{in}$ becomes 90°, that is, a point at which $\sin \theta_{in}=1$, becomes the critical angle according to the Snell's law equation. An angle of incidence $\theta_{in}$ becomes a critical angle $\theta_c$. In this case, summarizing the critical angle $\theta_c$, it becomes $\sin^{-1}(n_2/n_1)$. Here, $n_2$ is a refractive index of waveguide glass and is a refractive index of 1.520 for a 532 nm wavelength. Further, $n_1$ is a refractive index of photopolymer and is a refractive index of 1.505 for a 532 nm wavelength. Therefore, the critical angle $\theta_c$ becomes 41.13°.

As shown in FIG. 3A, since the object beam is incident on the waveguide glass after passing through the photopolymer, the refractive index of the photopolymer should also be considered. Here, a difference between the refractive index of the waveguide glass and the refractive index of the photopolymer is approximately 0.015, and thus a deviation of 0.56° occurs. Accordingly, in the embodiment of the present invention, the refractive index of the photopolymer is not considered, and for convenience of recording, an angle of 45° is used as $\theta_{in}$ of the in-couple HOE, which is greater than the critical angle $\theta_c$ of 41.13°.

As shown in FIG. 3B, the out-coupled HOE functions as a transparent concave mirror that transmits the image relayed at an angle of 45° to the observer's eyes. As shown in FIG. 3C, the out-coupled HOE not only enlarges a real image output from a micro display, but also reconstructs the image at a deep depth position. As described above, $F_{oh}$, which is a focal length of the out-coupled HOE, becomes an important factor in determining a field of view (FOV) of the NED system as well as the size and depth of the image. However, since it is impossible to manufacture a high immersive screen having an infinite image size, it is necessary to analyze the maximum specification within a range considering the practical aspect.

Figure 4:
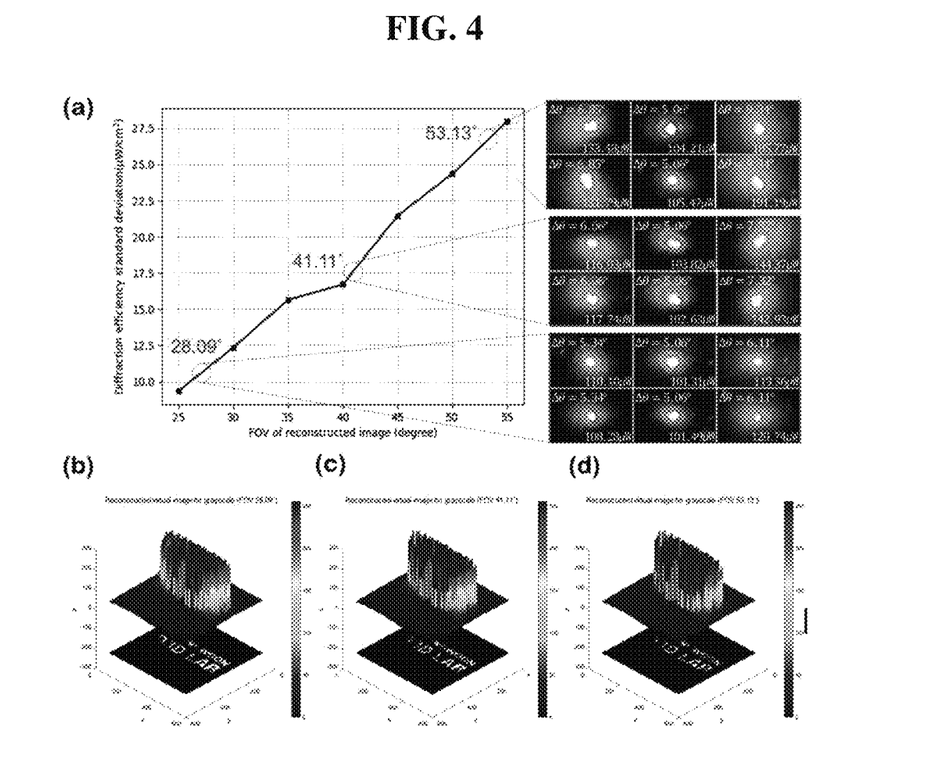
FIG. 4 is a set of diagrams comparing the size and uniformity of a reconstructed image according to the angular distribution of a field of view (FOV)

FIG. 4 is a set of diagrams comparing the size and uniformity of a reconstructed image according to the angular distribution of a FOV. FIG. 4A is a diagram comparing the intensity of the reconstructed image according to the FOV, FIG. 4B is a diagram showing the angular distribution at a 28.09° FOV, FIG. 4C is a diagram showing the angular distribution at a 41.11° FOV, and FIG. 4D is a diagram showing the angular distribution at a 53.13° FOV.

FIG. 4A shows the size and uniformity of the reconstructed image according to the focal length $F_{oh}$ of the out-coupled HOE at a determined depth. The FOV makes the value different using a size of a screen as an aperture. The focal length $F_{oh}$ of the out-coupled HOE is maintained at 20 mm, and screens having sizes of 20 mm³, 15 mm³, and 10 mm³ are used. When a full image is input on the screens, 28.09°, 41.11°, and 53.13° FOVs may be obtained.

In order to check diffraction efficiency at different recording angles according to each hogel, a HOE manufactured in a conventional analog method is used in the NED system. An entire effective area is divided into six areas, and a reconstructed beam diffracted in each area is measured to measure diffraction efficiency for each hogel. When it is assumed that Or is an angle in a linear space where a straight line entering the out-coupled HOE at a TIR angle of 45° and each hogel converges at the focal length, the diffraction efficiency for each hogel is determined as in [Equation 1] below.

$$\Delta\theta = -\frac{\lambda_o\sqrt{n^2 - \sin^2\theta_r}}{T\sin\theta_r\cos\theta_r} \quad \text{[Equation 1]}$$

Here, n denotes the refractive index of the photopolymer and is a refractive index of 1.505 for a 532 nm wavelength. T denotes a thickness of the photopolymer and is 16 μm. These conditions are applied based on a datasheet of the photopolymer used as the out-coupled HOE.

FIG. 4A shows reconstructed beams in each hogel according to the FOVs. HOEs having 28.09°, 41.11°, and 53.13° FOVs show deviations of 10 μW, 17.5 μW, and 27.5 μW in diffraction efficiency, respectively.

FIGS. 4B to 4D show values obtained by normalizing the intensity to 255 levels by converting the reproduced image into a grayscale image. It can be seen that the deviation of the image increases as the FOV goes from 28.09° to 53.13°. This shows that a reproduction deviation between a left part and a right part of the image increases as the FOV increases.

Therefore, in the method of hologram recording according to the embodiment of the present invention, in order to increase the FOV, the deviation in diffraction efficiency for each hogel makes reconstruction ability according to an angle of a holographic image different in the central portion of the recording surface of the holographic recording medium and the remaining areas. In this case, the central portion of the holographic recording medium is an area to which reference beams are incident in parallel when the hologram is reproduced. For example, the hologram is recorded in a method of increasing the intensity of the object beam so that brightness increases from the central portion of the holographic recording medium to the edge or reducing the intensity of the object beam so that the brightness decreases from the edge to the central portion, and thus an amount of light diffracted on the entire recording surface of the holographic recording medium is made uniform when the hologram is reproduced.

Figure 5:
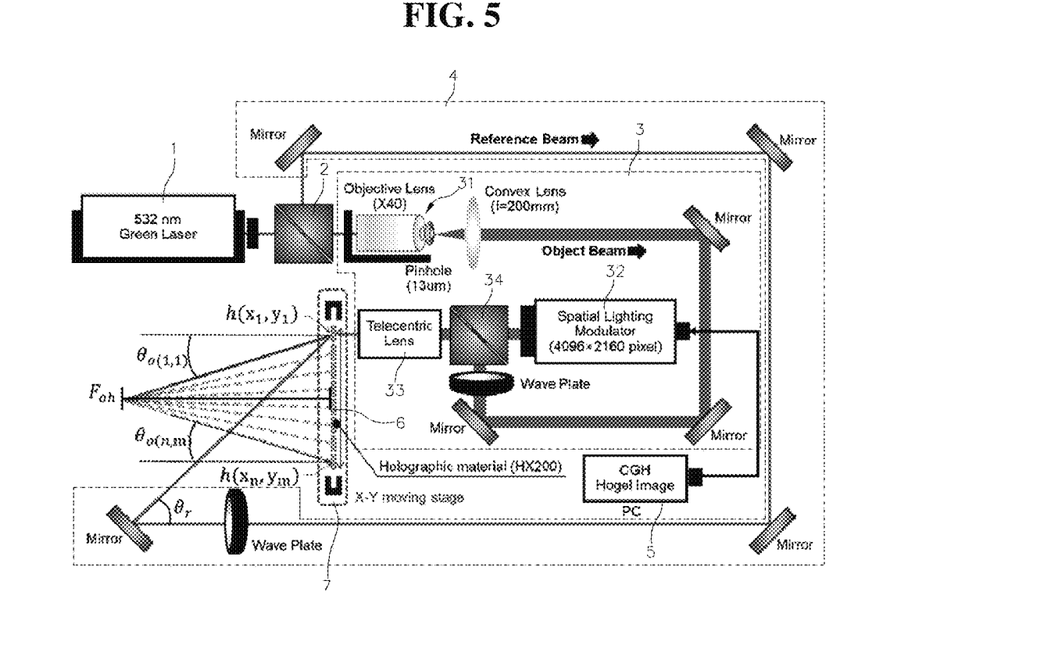
FIG. 5 is a configuration diagram illustrating an apparatus for hologram recording according to an embodiment of the present invention.

FIG. 5 is a schematic configuration diagram illustrating an apparatus for hologram recording according to an embodiment of the present invention.

Referring to FIG. 5, the apparatus for hologram recording according to the embodiment of the present invention includes, for example, a laser 1, a beam splitter 2, an object beam optical unit 3, a reference beam optical unit 4, a control computer 5, a holographic recording medium 6, and an X-Y stage 7.

The laser 1 is a device that generates light (a laser beam), and outputs, for example, light of a 532 nm wavelength. The light output from the laser 1 is split into an object beam, which is a signal beam, and a reference beam through the beam splitter 2. The object beam is transmitted to the holographic recording medium 6 through the object beam optical unit 3, and the reference beam is transmitted to the holographic recording medium 6 through the reference beam optical unit 4.

The object beam optical unit 3 includes a spatial filter 31. The spatial filter 31 removes noise from the object beam split through the beam splitter 2 using an objective lens and a pinhole, and adjusts an amount of light of the object beam. The object beam passing through the spatial filter 31 is mirrored to the SLM 32 through a convex lens and a plurality of mirrors and then recorded on the holographic recording medium 6 through a condensing lens 33.

The object beam passing through the spatial filter 31 is collimated into a collimated beam, and enters the SLM 32 through the convex lens, the plurality of mirrors, a wave plate, and a polarized beam splitter (PBS) 34. The SLM 32 has, for example, a pixel size of 4 μm and a resolution of 4096×2160, and modulates the incident object beam using a CGH fringe pattern transmitted from the control computer 5 to generate a diffractive beam. The diffractive beam generated in this way is incident on the holographic recording medium 6 through the condensing lens 33 using the polarized beam splitter (PBS) 34 and recorded thereon.

The condensing lens 33 de-magnifies the object beam incident from the SLM 32, for example, by ×0.06 magnification, and records the object beam at h(x1, y1), which are first positional coordinates of the holographic recording medium 6. Accordingly, one CGH image de-magnified and recorded at a predetermined ratio is recorded at h(x1, y1), which are the first positional coordinates of the holographic recording medium 6 through the condensing lens 33. In this case, a telecentric lens may be used as the condensing lens 33, and the ratio of the de-magnified object beam is determined in consideration of a beam width of the reference beam. Hogels are sequentially recorded on the holographic recording medium 6 using such a recording method. The holographic recording medium 6 is moved to next positional coordinates using the X-Y stage 7, and then the hogels are sequentially recorded at final positional coordinates $h(x_n, y_m)$ (here, n and m are natural numbers).

As illustrated in FIG. 5, the reference beam optical unit 4 causes the reference beam to be incident on the holographic recording medium 6 at the same angle of 45° as the TIR angle in the NED through the mirrors and the wave plate.

Meanwhile, the SLM 32 may display a source image for recording, and in this case, the source image may have, for example, a size of 0.5 μm in vertical and horizontal directions. A CGH fringe pattern, which is a source image displayed on the SLM, may be generated using the Rayleigh-Sommerfeld diffraction integral (RSD).

Figure 6:
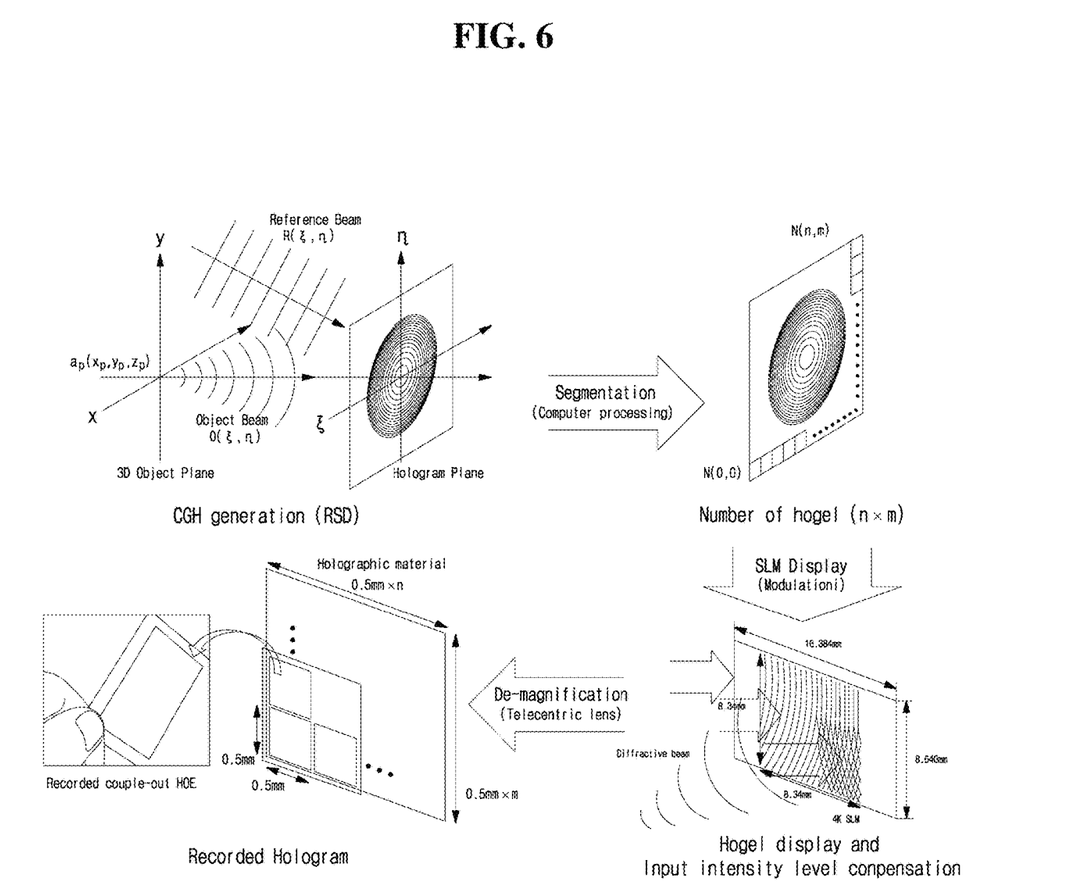
FIG. 6 is a diagram showing a process of recording holograms on a holographic recording medium in units of hogels using a computer-generated hologram (CGH) fringe pattern generated using the Rayleigh-Sommerfeld diffraction integral (RSD)

FIG. 6 is a diagram showing a process of recording holograms on a holographic recording medium in units of hogels using a computer-generated hologram (CGH) fringe pattern generated using the RSD.

Referring to FIG. 6, a hologram (object wave) is positioned on a ξ–η plane, and a value of positional coordinates of a $p^{th}$ spot becomes p(x, y, z). Since a diffractive beam should be concentrated on one spot, the hologram serves as a point source by setting the coordinates to $x_p=y_p=z_p$. Each spot has an amplitude, $a_p$, and a relative phase, $\phi_p$, which are real values.

As a supplementary description of the point source, optical setups for recording holograms in HOEs, which serve to bring parallel light onto a convex lens and form a focal point at a certain distance, are classified into two types of methods. The first method is a method of recording a hologram using a lens with a desired focal point, and the second method is a method of recording a hologram using a light source (here, the light source is equal to a focal length of the lens) that spreads light starting from one spot, moving the light from left to right, and passing through a convex lens to generate parallel light. These methods differ only in whether the light travels from left to right or from right to left, but the overall shape is the same. Therefore, the point source is a light source that spreads light starting from one spot in order to manufacture a convex lens.

As shown in FIG. 6, a virtual CGH pattern is generated using the RSD. A method of generating the virtual CGH pattern is as follows. A hologram O(ξ, η) having a complex amplitude distribution may be determined by overlapping object waves and may be expressed by [Equation 2] below.

$$O(\xi, \eta) = \sum_{p=1}^{N} \frac{a_p}{r_p} \exp\{j(kr_p + \phi_p)\} \qquad \text{[Equation 2]}$$

Here, k denotes the reciprocal of a wavelength (wavenumber) and is defined as $k=2\pi/\lambda$. $r_p$ denotes a distance (i.e., a distance between a point source and a hologram plane) between the point source and ξ, η, which is a position of the hologram plane (holographic recording medium), and may be obtained by [Equation 3] below.

$$r_p = \sqrt{(\xi-x_p)^2+(\eta-y_p)^2+z_p^2} \qquad \text{[Equation 3]}$$

Since the reference beams of the NED are incident in parallel, R(ξ, η) becomes $a_p \exp\{-jk(\xi \sin\theta_\xi+\eta \sin\theta_\eta)\}$. Here, $a_p$ denotes a complex amplitude, and $\theta_\xi$ and $\theta_\eta$ denote angles of incidence of the reference beam of a ξ axis and a η axis, respectively.

All complex amplitude distributions on the hologram plane are formed due to the interference of the object wave with the reference wave, and are represented by O(ξ, η)+R (ξ, η). An overall intensity pattern represents an intensity distribution of light and may be expressed as $I(\xi, \eta)=|O+R|^2=|O|^2+|R|^2+R^*O+RO^*$. Here, among four terms on the right side, the third and fourth terms are holograms and have interference information. Therefore, when the CGH fringe pattern is calculated by the control computer 5, I(ξ, η) may be expressed again by [Equation 4] below using two terms (the third term and the fourth term).

$$I(\xi, \eta) = \sum_{i}^{N} \frac{a_i}{r_i} \exp(kr_i + k\xi\sin\theta_\xi + k\eta\sin\theta_\eta) \qquad \text{[Equation 4]}$$

Next, the CGH fringe pattern produced using the above [Equation 4] is divided into n pieces horizontally and m pieces vertically (here, n and m are natural numbers) through the processing of the control computer 5. That is, the CGH fringe pattern is divided into n×m pieces corresponding to the number of hogels. The CGH fringe pattern (fringe pattern of each hogel unit) divided into the n×m pieces corresponding to each hogel unit is displayed only as a square image on a rectangular panel of the SLM 32, for example, a panel with a size of 8.34 mm.

The SLM 32 modulates the incident object beam using each CGH fringe pattern corresponding to each hogel and transmits the object beam to the condensing lens 33, and the object beam for each hogel transmitted in this way is de-magnified by a predetermined magnification in the condensing lens 33 and the de-magnified hogel has a size of 0.5 mm. In this case, when the SLM 32 modulates the object beam using each CGH fringe pattern for each hogel, the SLM 32 is controlled by the control computer 5 to selectively change and modulate the intensity (luminance) of the object beam for each hogel. That is, in the SLM 32, the intensity of the object beam for each hogel is varied so that the deviation in diffraction efficiency becomes uniform on the entire recording surface of the holographic recording medium when the hologram is reproduced in response to the deviation in diffraction efficiency for each hogel.

Meanwhile, in the case of the in-coupled HOE, since it is incident as a plane wave and only needs to be tilted at an angle of 45°, there is no need for a separate process of generating the CGH fringe pattern, and thus only an 8.34 mm square white background image is used for display.

The reason why the CGH fringe pattern is divided into n pieces horizontally and m pieces vertically is that a convex lens that converges light at a focal length should be manufactured in a hologram printing system. Here, each divided hogel of the holographic recording medium is recorded to serve to converge light in one direction, and finally, when the light is input under the recording conditions (in printing, light entering horizontally is used using a plane wave as a reference beam), the HOE in which the light is concentrated is manufactured like a convex lens. In addition, in order to record a hologram using printing technology, it is necessary to divide hogels in an x-axis direction and a y-axis direction and record the hogels, and arrange the hogels according to a size of each hogel to generate one large hologram when the hologram is recorded. In the method of generating the CGH fringe pattern for this purpose, instead of making each hogel one by one, a CGH fringe pattern for a final hologram is produced in a large size and then cut into small hogel units. For example, the method is the same method as drawing a whole puzzle on one large board and then cutting the puzzle into smaller pieces. When the CGH fringe pattern is divided according to the size of the hologram, n×m hogels (puzzle pieces) are obtained.

Figure 7:
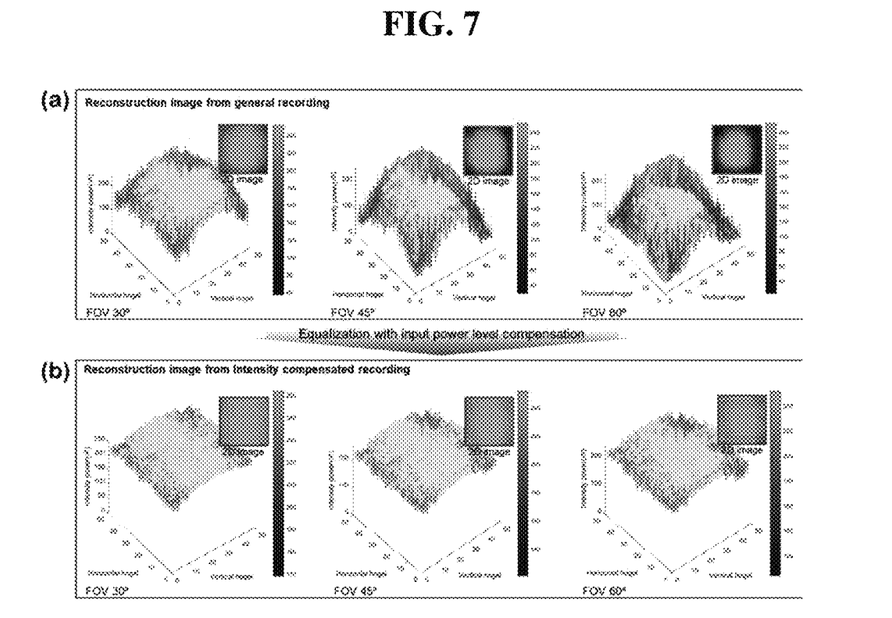
FIG. 7 is a set of diagrams showing operational effects of a method of hologram recording according to an embodiment of the present invention.

FIG. 7 is a set of diagrams showing operational effects of a method of hologram recording according to an embodiment of the present invention, wherein FIG. 7A is a diagram showing results of printing without compensation for a deviation in diffraction efficiency (reconstruction) and then radiating a reference beam, and FIG. 7B is a diagram showing results of recording holograms using different amounts of light in consideration of the deviation in diffraction efficiency as in FIG. 7A when each hogel is recorded.

As shown in FIG. 7A, as a result of radiating the reference beam after printing without reconstruction compensation, it can be seen that a deviation between the central area and the edge area occurs severely at 53.15° than at 28.07°, which is the narrowest FOV. Looking at the deviation at the end of the final edge centered at the central portion, it can be seen that efficiency is reduced by 52.70%, 81.67%, and 92.34% on average in the order of the FOVs of 28.07°, 41.11°, and 53.13°, respectively. As shown in FIG. 7B, in the case of recording the holograms using different amounts of light in consideration of the above deviation in diffraction efficiency when each hogel is recorded, an entirely uniform result may be obtained in FIG. 7B, unlike FIG. 7A.

As shown in FIG. 7, as a result of printing without reconstruction compensation and then radiating the reference beam, it can be seen that the deviation between the central area and the edge area occurs severely at 53.15° than at 28.07°, which is the narrowest FOV. That is, as the FOV increases, the deviation between the central area and the edge area becomes more severe. This is because, during hologram recording, the object beam incident on the holographic recording medium is incident at different angles, resulting in recording at different recording angles. The holograms (hogels) recorded at different angles in this way cause different diffraction efficiencies due to the different recording angles. For example, the central area is relatively bright compared to the edge area. This causes a reproduction imbalance in the HOE-based NED.

The compensation for the deviation in diffraction efficiency for each hogel to compensate for the deviation in diffraction efficiency may be implemented by varying the intensity (brightness) of the optical power which is modulated by the SLM 32 and recorded on the holographic recording medium 6, that is, the intensity (brightness) of the object beam. As illustrated in FIG. 5, the control computer 5 calculates the intensity of the object beam for each hogel to correspond to the pre-analyzed deviation in diffraction efficiency for each hogel, and outputs a control signal corresponding thereto to the SLM 32. The SLM 32 varies the intensity of the object beam when modulating the object beam using the CGH fringe pattern according to the control signal input from the control computer 5, that is, an optical power signal.

In the method of hologram recording according to the embodiment of the present invention, the intensity of the object beam to be recorded on the holographic recording medium 6 is varied for each hogel in response to the deviation in diffraction efficiency for each hogel. For the same reason as in FIG. 2, there is a large difference in recording angle between the central area and the edge area of the holographic recording medium 6. Accordingly, in the holographic recording medium 6, a large deviation in diffraction efficiency occurs in the central area and the edge area. Therefore, the intensity of the object beam recorded in the central area may be reduced so that the brightness decreases in the central area of the holographic recording medium 6, or the intensity of the object beam recorded in the edge area may be increased so that the brightness increases in the edge area of the holographic recording medium 6. Or course, the intensity of the object beam may be varied for each hogel.

Figure 8:
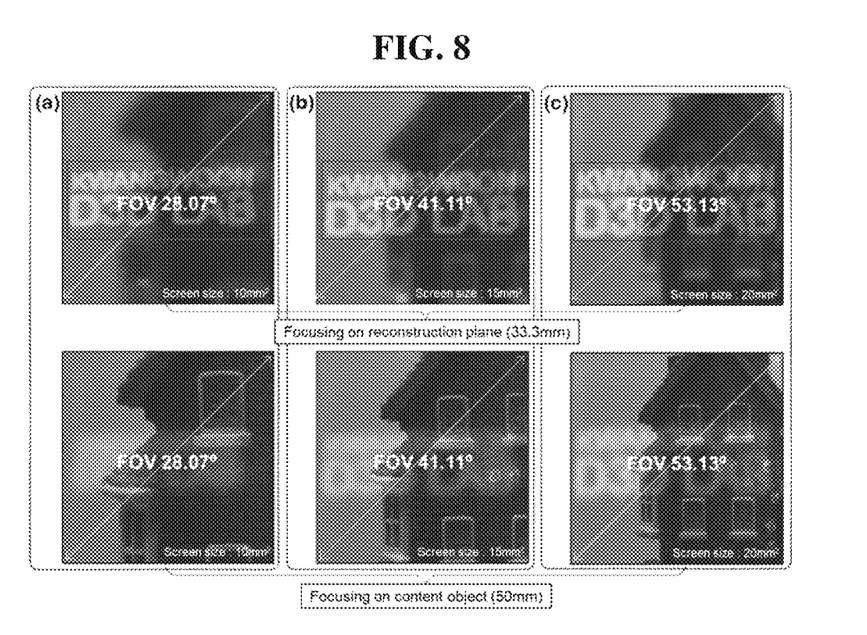
FIG. 8 is a set of diagrams showing results of reproducing an image using a holographic recording medium on which a hologram is recorded as a result of using a method of hologram recording according to an embodiment of the present invention.

FIG. 8 is a set of diagrams showing results of reproducing an image using a holographic recording medium on which a hologram is recorded as a result of using a method of hologram recording according to an embodiment of the present invention, wherein FIG. 8A shows an image reconstructed with an out-coupled HOE at a 28.07° FOV and a size of 10 mm$^2$, FIG. 8B shows an image reconstructed with an out-coupled HOE at a 41.11° FOV and a size of 15 mm$^2$, and FIG. 8C shows an image reconstructed with an out-coupled HOE at a 53.13° FOV and a size of 20 mm$^2$.

Referring to FIG. 8, in order to manufacture the out-coupled HOEs with different FOVs, floating AR reconstruction images of 53.30 mm, 36.23 mm, and 21.65 mm are displayed with HOE screen sizes of 10 mm$^2$, 15 mm$^2$, and 20 mm$^2$. The HOE may use a CGH fringe pattern calculated to have a focal length of 20 mm, and may be adjusted by a distance away from a spot, which is a three-dimensional (3D) object, and a hologram plane. Each FOV is adjusted to the size of the screen, and the image is displayed to fill a horizontal width of the screen.

As described above, according to the method and apparatus for holographic recording according to the embodiment of the present invention, the hologram can be recorded after the deviation in diffraction efficiency for each hogel is pre-compensated for by varying the intensity (luminance) of the object beam for each hogel during the hologram recording in response to the deviation in diffraction efficiency (reconstruction efficiency) for each hogel of the holographic recording surface that occurs when the hologram is reproduced.

Therefore, according to the present invention, by recording the hologram after pre-compensating for the deviation in diffraction efficiency for each hogel during the hologram recording, it is possible to make the diffraction efficiency uniform on the entire holographic recording surface when the hologram is reproduced, and thus it is possible to resolve the reproduction imbalance of a HOE-based NED.

As described above, although exemplary embodiments of the present invention have been described and illustrated using specific terms, such terms are only intended to clarify the present invention. In addition, it is obvious that various modifications and changes can be made to the embodiments and the described terms of the present invention without departing from the technical spirit and scope of the following claims. Such modified embodiments should not be individually understood from the spirit and scope of the present invention, and should be understood to fall within the scope of the claims of the present invention.

What is claimed is:

1. A method of hologram recording, in which holograms are recorded in a method of tiling an entire recording surface of a holographic recording medium by interfering with an object beam and a reference beam for each divided hogel on the holographic recording medium divided in units of hogels and recording the holograms using holographic printing technology,     analyzing, by a control computer, deviations in diffraction efficiency for each hogel according to a recording angle for each hogel when holograms are recorded on the holographic recording medium for each hogel, wherein the recording angle refers to a crossing angle formed by the object beam and the reference beam when the holograms are recorded by interference of the object beam and the reference beam on the holographic recording medium;

pre-compensating, by the control computer, the deviations in diffraction efficiency by varying an intensity of the object beam for each hogel according to the deviations in diffraction efficiency; and     recording, by an object beam optical unit, holograms by varying the intensity of the object beam for each hogel in accordance with the pre-compensated intensity and allowing the varied object beam to be incident on the holographic recording medium.

2. The method of hologram recording of claim 1, wherein, in the pre-compensating the deviations in diffraction efficiency, the intensity of the object beam is increased so that brightness increases from a central portion to an edge of the holographic recording medium, or decreased so that the brightness decreases from the edge to the central portion of the holographic recording medium.

3. The method of hologram recording of claim 1, wherein, in the pre-compensating the deviations in diffraction efficiency, a computer-generated hologram (CGH) fringe pattern is generated for modulation of the object beam.

4. The method of hologram recording of claim 3, wherein, in the pre-compensating the deviations in diffraction efficiency, the CGH fringe pattern is generated using the Rayleigh-Sommerfeld diffraction integral (RSD).

5. The method of hologram recording of claim 4, wherein, in the pre-compensating the deviations in diffraction efficiency, the generated CGH fringe pattern is divided into n×m pieces (here, n and m are natural numbers) corresponding to the number of hogels, and the object beam is modulated using each of the divided pieces of the CGH fringe pattern.

6. An apparatus for hologram recording, in which holograms are recorded in a method of tiling an entire recording surface of a holographic recording medium by interfering with an object beam and a reference beam for each divided hogel on the holographic recording medium divided in units of hogels and recording the holograms using holographic printing technology, the apparatus comprising:

a laser configured to output a laser beam;

a beam splitter configured to split the laser beam into an object beam and a reference beam;

a control computer configured to generate a computer-generated hologram (CGH) fringe pattern;

an object beam optical unit configured to transmit the object beam to the holographic recording medium and record the object beam;

a reference beam optical unit configured to allow the reference beam to be incident on the holographic recording medium,         wherein the control computer analyzes deviations in diffraction efficiency for each hogel according to a recording angle for each hogel when holograms are recorded on the holographic recording medium for each hogel, and         wherein the recording angle refers to a crossing angle formed by the object beam and the reference beam when the holograms are recorded by interference of the object beam and the reference beam on the holographic recording medium; and     pre-compensates the deviations by varying an intensity of the object beam for each hogel according to the deviations in diffraction efficiency,     wherein the object beam optical unit comprises:

a spatial light modulator configured to modulate the incident object beam using the CGH fringe pattern provided by the control computer, and vary the intensity of the object beam for each hogel in accordance with the pre-compensated intensity, and         a condensing lens configured to condense the object beam modulated by the spatial light modulator onto the holographic recording medium.

7. The apparatus for hologram recording of claim 6, wherein the control computer increases the intensity of the object beam so that brightness increases from a central portion to an edge of the holographic recording medium, or decreases the intensity of the object beam so that the brightness decreases from the edge to the central portion of the holographic recording medium.

8. The apparatus for hologram recording of claim 6, wherein the control computer generates the CGH fringe pattern using the Rayleigh-Sommerfeld diffraction integral (RSD) and then divides the generated CGH fringe pattern into n×m pieces horizontally and vertically (here, n and m are natural numbers) corresponding to the number of hogels to provide the divided pieces of the CGH fringe pattern to the spatial light modulator.

\* \* \* \* \*